Oct. 30, 1928.
H. OPPENHEIMER
OIL DISTRIBUTOR
Filed April 19, 1927
1,689,680
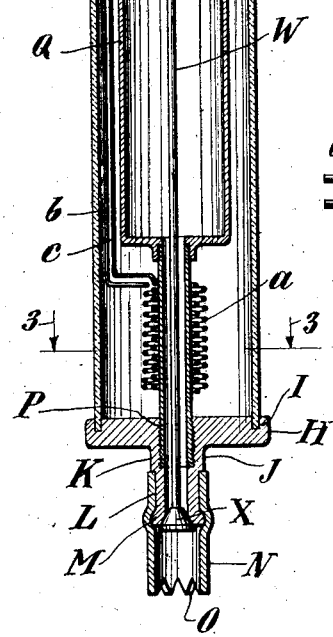

Patented Oct. 30, 1928.

1,689,680

UNITED STATES PATENT OFFICE.

HERBERT OPPENHEIMER, OF NEW YORK, N. Y.

OIL DISTRIBUTOR.

Application filed April 19, 1927. Serial No. 184,848.

My invention relates to a device which has for its purpose to distribute heated oil to the face, scalp or other portions of the body, which heated oil or other preparation is employed in treating such parts.

My invention further relates to the combination, with an oil distributor, of a flexible and a movable device for distributing the oil and massaging the part to which the oil is applied.

The accompanying drawings will serve to illustrate my invention. Fig. 1 is a vertical section; Fig. 2 is a transverse section on the line 2—2; Fig. 3 is a transverse section on the line 3—3.

In the drawings, A is a casing, preferably made of a non-conducting heat material which will not be affected by the oil or other substances used in the distributor. Connected to the top of the casing is an annular body, B, having a screw thread, C, on its lower and interior periphery, and a screw thread, D, on its upper and inner periphery. Mounted on the top of the part B is a cover, E, provided with a screw thread, F, which co-acts with the screw thread, D, to keep the part E in place, and permit its removal when desired. The part C also has formed in it a central opening, G. Attached to the bottom end of the casing, A, is a cover, H, having a circumferential groove, I, to receive the bottom of the casing, A. The part H is also provided with a depending extension, J, which has two diameters, K, the larger, and L, the smaller, which is slightly enlarged on its lower end, M, to receive a detachable member, N, preferably provided with a serrated lower edge, O. The part, N, is preferably made of rubber or other flexible material, and is held in position on the extension, J, by its elasticity. The part, N, when once used, is intended to be thrown away, and to be replaced by another similar part, thus insuring that the part of the instrument which comes in contact with the part of the body to which the oil is to be applied, shall be clean and sanitary. The part H, has formed in it a central opening, P.

Located within the casing, A, is a receptacle, Q, which is screw threaded at its upper end, R, which screw threading co-operates with the screw threads, C, in the part B. The lower end of the receptacle, Q, is of a reduced diameter, and its lower end is extended into the opening, P, of the part J, and is screw threaded to cooperate with a screw thread on the inner periphery of the part J.

Near the upper end of the receptacle, Q, is formed a depressed groove, S, which serves to support the lower end of the spring, T.

Situated over the upper end of the spring, T, is a plate, U, provided with a depending portion, V, which is also interiorly screw threaded to receive the upper threaded portion of the rod, W. On the lower end of the rod, W, is a cone shaped valve member, X, which cooperates with the opening P in the part J to open and close such opening to permit the flow of oil as desired. Situated at the top of the instrument is a presser portion, Y, provided with an enlarged upper portion milled on its edge, to act as a thumb push, and a plate at its bottom portion, Z, which cooperates with the plate, U, cover the spring, T.

Surrounding the part of the reduced diameter of the receptacle, Q, is an electric heating coil, a, having its terminal wires, b, c, carried upward and out of the casing A, as shown in Figs. 1 and 2. These terminal wires are carried in a body, d, inserted and secured in an opening, e, in the body of the casing, A. The cover, E, is removable, and when removed, oil or other preparations which it is desired to apply, may be introduced into the receptacle, Q. The oil is prevented from flowing out of the receptacle, Q, by the cone-shaped valve, X, which is held in closed position by the action of the spring, T. When it is desired that oil shall flow, the presser portion, Y, is depressed, which causes the valve, X, to move downward, and allows the oil to drop into the part, N. When the electric current is turned on, and flows through the coil, a, the oil in the reduced portion of the receptacle, Q, is heated. By applying the heat to the lower portion of the receptacle, Q, the temperature of the oil is raised to the desired point immediately above the point of delivery from the distributor, and the outside of the distributor is kept cool, to facilitate handling.

The particular advantage of my improved distributor consists in the fact that oil or other material which it is desired to apply may be delivered in small quantities at any point or points on the scalp or skin, where it is considered advisable, and rubbed in by moving the part, N, over the part to which the oil is applied, to obtain a massaging effect and the absorption of the oil or other material.

Having thus described my invention, I claim:

1. An oil distributor comprising a casing, an oil receptacle located within the casing, having two diameters, and having a removable cover to permit the introduction of oil into said receptacle, a heating unit located within the casing and surrounding a portion of the smaller diameter of the oil receptacle, the heating unit having its terminals carried out of the casing, together with means for controlling the flow of oil from the oil receptacle when desired.

2. An oil distributor comprising a casing, an oil receptacle located within the casing, a heating element for the material in the receptacle located in the casing, a hollow tubular flexible massaging member detachably secured to the delivery end of the distributor, a serrated lower edge on the massaging member, and means for controlling the flow of material from the receptacle as desired.

3. An oil distributor comprising a casing, an oil receptacle located within the casing, having two diameters and having a removable cover to permit the introduction of oil into said receptacle, a heating unit located within the casing and surrounding a portion of the smaller diameter of the oil receptacle, a hollow flexible massaging member removably secured to the delivery end of the distributor, and means for controlling the flow of material from the receptacle through the massaging member.

4. An oil distributor comprising a casing, an oil receptacle in the casing, a heating element for the material in the receptacle located in the casing, a hollow tubular flexible massaging member detachably secured to the delivery end of the distributor, and means for controlling the flow of material from the receptacle as desired.

In testimony whereof, I affix my signature.

HERBERT OPPENHEIMER.